Patented June 28, 1938

2,121,896

UNITED STATES PATENT OFFICE 2,121,896

CREAM PROCESS AND PRODUCT

Herman D. Wendt, deceased, late of West Chester, Pa., by Ada R. Wendt, administratrix, Coudersport, Pa., assignor to Milk Processes, Inc., Philadelphia, Pa., a corporation of Pennsylvania No Drawing. Application March 15, 1935, Serial No. 11,210

5 Claims. (Cl. 99—62)

The present invention relates to cream products and methods of production and manipulation of such products in the preparation from such products of other desired creamery products with respect to which they form intermediate products. It constitutes an improvement in detail over features described and claimed in the prior Patent Reissue No. 19,123.

In the reissue patent, referred to above, there is described and claimed a cream product having a butter fat concentration of over 65% in the dispersed phase and processes of producting other creamery products by the dilution and/or manipulation of such a cream product. The cream product claimed in that application contains a quantity of milk solids-not-fat comprising approximately the natural proportion of such solids occurring in the quantity of liquid vehicle constituting a part of such cream product. such liquid vehicle constituting from 15 to 35% of the cream product in question.

The present invention relates to a cream product embodying between 65 and 85% butter fat and incorporating a proportionate content of solids-not-fat substantially higher than the proportion of such solids incorporated in the cream product of the prior invention. It also relates to certain features of manipulation involving important advantages which can be attained in the production of other butter fat-containing products from a product of this character.

In the prior patent, there is disclosed the production of a creamery product of lower butter fat concentration than the 65 to 85% content in the cream product resulting from the centrifugal separating treatment of that patent, by the dilution of the cream product of that patent with liquid, such liquid being in some cases water, in other cases skim milk, and in other cases liquid containing other ingredients which are to be incorporated in the ultimate creamery product in accordance with the requirements of the product ultimately to be produced. In cases in which the product in question is diluted with water or with liquid of the general character of skim milk and of lower concentration of solids-not-fat than the liquid removed from the initial milk product incident to its centrifugal concentration, the resulting product will naturally have a smaller proportionate content of the natural ingredients of the liquid removed than does the original milk product from which the super cream was concentrated. It is, in many cases, desirable to dilute a super cream, such as that produced by the process of the prior invention, with water or other dilute liquid, and it is likewise desirable that the so diluted product contain a proportion of the natural content of solids-not-fat of the original vehicle corresponding to the proportion of such solids present in the initially removed vehicle.

In the production of ice cream, for example, it is desirable that a proportion of such solids be present which is at least as great as the proportion of such solids present in the original liquid vehicle and in many cases it may be desirable to have an even greater proportion of such solids in the liquid vehicle of the diluted creamery product.

The dilution of a creamery product of high butter fat content, such as that defined in the prior patent, with liquid vehicle, such as water or other dilute liquid, sometimes presents unusual difficulties in connection with the incorporation of such liquid with the cream product in that it produces an unstable composition which has a strong tendency toward butter formation when agitated to effect thorough emulsification of the butter fat of the super cream in the added liquid. The presence of milk solids in a composition of this character tends to stabilize the emulsion of butter fat in serum. The treatment of a product having a very substantially smaller proportionate content of milk solids to serum than that ordinarily contained in the natural milk serum, e. g., the centrifugation of such a product or the agitation of such a product to effect thorough dispersion of the butter fat thereof in dilute liquid, sometimes causes demulsification of the mixture and undesired agglomeration of the butter fat particles.

The objects of the present invention are to provide a butter fat-containing product of the general type of the prior patent, containing butter fat in the dispersed phase and having a content of milk solids-not-fat much higher than would ordinarily be contained in the liquid vehicle obtained by the centrifugation of an ordinary milk or cream to produce a butter fat-containing product having the butter fat content of the product in question. Further objects of the invention relate to the further manipulation of a high butter fat content cream of this character to produce other butter fat containing products, such as ordinary table cream, whipping cream, whole milk, ice-cream, cream cheese or the like, by a process of simple dilution of the super cream product with water or other very dilute liquid, the present invention possessing an important advantage over prior processes for producing products of this character and over the prior patent in that such products can be produced from a super cream of butter fat content corresponding to that described in the prior patent without danger of the undesired agglomerating tendency referred to above.

In the preferred practice of the present invention the super cream containing over 65% butter fat in the dispersed phase is produced by steps including centrifugation of ordinary whole milk or cream containing the normal solids-not-fat content of such milk or cream or a higher than normal content of solids-not-fat. The important feature of the invention consists in the fact that the super cream product ultimately produced contains a very substantially higher content of solids-not-fat than that which would normally be contained in the liquid vehicle of the super cream. Such solids-not-fat content of the super cream may be incorporated in that cream by the following alternative procedures. The whole milk or cream from which the super cream is produced may be initially blended with solids-not-fat by the steps of adding evaporated milk, milk powder or condensed milk to the original milk or cream product prior to the step of concentration to produce the super cream, the solids being added in such proportion as to afford the desired concentration of milk solids in the liquid vehicle of such cream after the removal of a large part of the liquid by centrifugal concentration of such cream to produce a super cream containing over 65% butter fat content. The addition of milk solids prior to the centrifugation of the initial milk product has the important advantage that it tends to stabilize the emulsion and minimize the objectionable phenomena of butter formation and oiling incident to the centrifugation of this product to produce the super cream.

As an alternative to this procedure, the ordinary cream or milk may first be concentrated to a 65% or greater butter fat content and the milk solids may thereafter be added to the super cream so produced while such cream is heated to a condition of butter fat fluidity, i. e., to a temperature substantially above 100° F. prior to the cooling of such super cream. In connection with the incorporation of the milk solids in this last mentioned manner, a preferred method of procedure involves the addition of these solids in one of the forms indicated above to the concentrated cream product discharged into the cream cover of the centrifugal separator. Cream discharged into this cover is discharged in a highly dispersed form and the thorough incorporation of additional milk solids in such cream is therefore a relatively simple matter at this stage of the treatment thereof.

When it is desired to produce an ordinary cream product, ice cream or other product which contains butter fat in a proportion which is as little or less than that contained in ordinary table cream by dilution with water, it is ordinarily desirable to add a quantity of milk solids to the super cream which is at least as great as the normal milk solids already contained in the liquid of such cream and is usually very considerably greater than the quantity of such solids contained in the super cream. A liquid or plastic super cream containing milk solids in a proportion substantially greater than that normally contained in the liquid vehicle of such a cream and preferably comprising milk solids in greater than 100% excess of the proportion contained in the liquid vehicle of such cream can be diluted with water or other liquid vehicle with much less agitation than that required to effect homogenization of a super cream of normal milk solids content with such liquid vehicle. It will therefore be seen that the production of a super cream containing an unusually high content of solids-not-fat possesses important advantages both from the standpoint of products which can be produced therefrom by simple manipulation and of the manipulation involved in the production of such products.

In the production of ice cream, for example, it is preferred to add a sufficient quantity of solids to a liquid super cream containing over 65% butter fat content to produce, when such cream is diluted to a concentration of approximately 20% butter fat content, a cream which contains approximately the same proportionate quantity of solids-not-fat as that which would be normally contained in a 20% cream which had not been subjected to the concentrating process of the prior patent. As an alternative to this procedure, the milk solids may be added to the liquid vehicle with which the super cream is to be diluted and this liquid vehicle thereafter incorporated with a super cream containing only the solids naturally contained in its liquid vehicle.

Modifications will be obvious to those skilled in the art and the invention should not be limited except by the scope of the sub-joined claims.

In cases in which reference is made in the claims of this application to "concentrated solids-not-fat", that expression is intended to designate a concentration of the solids-not-fat content of natural milk serum, as by evaporation. This expression is thus intended to designate any of the sources of these concentrated solids described in the specification of the present application, e. g., milk powder, evaporated milk or condensed milk.

What is claimed is:

1. The process of producing a milk product containing over 65% butter fat in the dispersed phase from a milk product containing a smaller proportion of butter fat which comprises adding milk serum solids to the original milk product and thereafter subjecting the milk product to which such solids have been added to centrifugal concentration to produce a milk product of the desired degree of concentration.

2. As a new article of manufacture in which the emulsion of butter fat in serum is stabilized, a super cream containing over 65% butter fat incorporated in dispersed phase in a liquid, said liquid having a substantially higher content of milk solids-not-fat than that forming the milk solids-not-fat content of the natural milk serum from which the super cream is concentrated.

3. As a new article of manufacture in which the emulsion of butter fat in serum is stabilized, a super cream containing over 65% butter fat incorporated in dispersed phase in a liquid, said liquid having a content of milk solids-not-fat more than double that of the natural milk serum from which the super cream is concentrated.

4. The process of producing a milk product containing butter fat in the dispersed phase which comprises producing a milk product containing butter fat in the dispersed phase in a proportion comprising over 65% of the total content of such milk product, incorporating therein concentrated milk solids-not-fat whereby the proportion of milk solids-not-fat in the liquid phase is increased and finally diluting the high butter fat concentration milk product with water.

5. The process of producing a milk product containing butter fat in the dispersed phase which comprises producing a milk product containing butter fat in the dispersed phase in a proportion comprising over 65% of the total content of such milk product, and finally diluting the high butter fat concentration milk product with a lactic liquid containing a greater proportion of milk solids-not-fat than that contained in the liquid phase of the product diluted whereby the proportion of milk solids-not-fat in the liquid phase is increased.

ADA R. WENDT,
*Administratrix of the Estate of Herman D. Wendt, Deceased.*